(12) United States Patent
Jirele

(10) Patent No.: US 6,883,245 B1
(45) Date of Patent: Apr. 26, 2005

(54) VARIABLE FUEL INJECTOR HEIGHT GAUGE

(75) Inventor: James E. Jirele, Owatonna, MN (US)

(73) Assignee: SPX Corporation, Charlotte, NC (US)

(*) Notice: Subject to any disclaimer, the term of this patent is extended or adjusted under 35 U.S.C. 154(b) by 0 days.

(21) Appl. No.: 10/682,737

(22) Filed: Oct. 10, 2003

(51) Int. Cl.[7] ................................................ G01B 3/18
(52) U.S. Cl. ............................. 33/613; 33/833; 33/600
(58) Field of Search ........................ 33/613, 832, 833, 33/834, 836, 502, 531, 606, 602, 607, 645, 542

(56) References Cited

U.S. PATENT DOCUMENTS

| | | | | |
|---|---|---|---|---|
| 2,178,658 A | * | 11/1939 | Turpan | 33/833 |
| 2,540,292 A | * | 2/1951 | Ritchie | 33/836 |
| 2,649,782 A | * | 8/1953 | Smith | 33/531 |
| 4,519,144 A | * | 5/1985 | Larsen | 33/836 |
| 6,694,832 B1 | * | 2/2004 | Gleeson | 33/836 |

* cited by examiner

Primary Examiner—Christopher W. Fulton
(74) Attorney, Agent, or Firm—Baker & Hostetler LLP; Marc W. Butler

(57) ABSTRACT

A method and apparatus for adjusting the height of a fuel injector in an engine assembly by providing a variable fuel injector height gauge, selecting a height on the gauge, setting the height on the gauge and adjusting the height of the fuel injector in accordance with the height of the gauge.

26 Claims, 7 Drawing Sheets

VARIABLE FUEL INJECTOR HEIGHT GAUGE

FIELD OF THE INVENTION

The present invention relates generally to a tool for adjusting a component in an assembly. More particularly, the present invention relates to an automotive tool which provides height adjustment to a fuel injector utilized in an automotive engine assembly.

BACKGROUND OF THE INVENTION

Examples of known fuel injection systems may use a fuel injector to dispense a quantity of fuel to be combusted in an internal combustion engine. A fuel injector may be considered to be an electronically controlled valve. It may also be configured to receive a supply of pressurized fuel delivered by a supply source in a fuel delivery process. A feature of the fuel injector may include opening and closing many times per second during an injection cycle. Ideally, the fuel injector is utilized to facilitate the maintenance of a balanced air-to-fuel mixture during the fuel delivery process.

A fuel delivery system of an automotive can be configured to readily utilize a fuel injector in order to provide fuel delivery per the injector cycle. By way of example, a fuel injector design may include a nozzle designed to atomize the fuel as pressurized fuel passes through the nozzle. This process generates a fine mist of fuel so that it can burn easily and achieve combustion within a valve chamber. The quantity of fuel that is dispensed to the fuel injector is varied in accordance with a number of engine parameters such as, for example, engine speed, engine load, and engine emissions.

The amount of fuel supplied to the engine is determined by the amount of time the fuel injector stays open. This parameter is known as the pulse width and may be typically controlled by an engine control unit or ECU. The engine control unit is generally responsible for controlling all of the electronic components on the engine. An electronic fuel injection system may typically monitor at least one of the aforementioned engine parameters and electrically operate the fuel injector to dispense fuel. The engine control unit (ECU) may also be employed to adjust the air-to-fuel ratio in real-time by monitoring the amount of oxygen in the exhaust.

In order to optimize the maximum efficiency of the fuel delivery process, it may be important to meet certain objectives in order to achieve accurate fuel metering and to provide quick response during the fuel delivery process. Hence, the positioning of the fuel injector relative to the intake valve is of value to some extent. For instance, in a variety of applications, the fuel injectors may be mounted in an intake manifold of an engine so that they may spray fuel directly at the engine intake valves. This may be accomplished via a fuel supply, such as a pipe known as a fuel rail, which supplies pressurized fuel to one or more of the fuel injectors during the fuel delivery process. Hence, by varying the fuel delivery per fuel injector cycle of the fuel injector during the fuel delivery process, one can directly affect the performance of the vehicle.

In a typical automotive configuration, an accelerator pedal may be connected to a throttle valve. This valve can be configured to regulate the amount of air which enters into an engine. In operation, depressing the accelerator pedal effectively opens up the throttle valve, thus, allowing more air to enter into the valve chamber. The engine control unit (ECU) "sees" the throttle valve open and may compensate accordingly by increasing the fuel rate in anticipation of more air entering into the engine. It is important to increase the fuel rate as soon as the throttle valve opens. Otherwise, when the gas pedal is first pressed, there may be a hesitation as some air reaches the cylinders without enough fuel mixed therein.

Additionally, other sensors may be utilized to monitor the mass of air entering the engine as well as the amount of oxygen in the exhaust. The engine control unit (ECU) may use this information to fine-tune the fuel delivery so that the air-to-fuel ratio is optimal.

Hence, fuel injectors have been known to operate under stringent conditions and within tight tolerance settings with respect to other inter-related engine components. By way of example, an electronic unit injector (EUI) may be utilized to inject diesel fuel under very high pressure into a combustion chamber of a respective diesel engine. These injectors may require a height adjustment that is unique for various engine models. Typically, height gauge tools have been utilized to facilitate orienting the electronic unit injector into position. When setting the original fuel injectors position in accordance with factory settings, each fuel injector requires a specific height adjustment that is unique for various engine models. This is also true when re-setting the proper height of the fuel injector(s) after servicing the fuel injector(s) and reassembling the fuel injector(s) in accordance with the proper factory setting. It is important to achieve the correct factor setting of the fuel injector(s) since most engines have a unique factory specification for respective fuel injectors. Depending on which engine is being utilized, a potentially different factory setting will be necessary to properly position the fuel injector(s).

Due to the potentially different requirements of fuel injection height settings per engine assembly, it is sometimes necessary to utilize various height gauge tools of different lengths. Any one of the height gauge tools of various lengths are typically used to set the fuel injector factory height setting required for a particular engine. Hence, for a particular factory setting of a fuel injector height, a single height gauge tool may be selected to properly install the fuel injector onto an engine at a prescribed height setting.

For another kind of engine, it is probable that a different height setting may be required in accordance to the factory setting of that engine. Hence, another height gauge tool may be selected to install the fuel injector(s) in accordance to the newly prescribed height setting of the engine. Accordingly, a different height gauge tool corresponding to the factory height settings of a particular type of engine can be necessary in order to set the height of the fuel injector.

While individual height gauge tools may provide a certain level of assistance in obtaining a proper height adjustment to the fuel injector(s) in an engine assembly, using individual height gauge tools to achieve pre-specified height settings of the fuel injector(s) may not provide the most efficient manner in which an operator works in order to make the aforementioned height adjustment(s) to the fuel injector(s). For instance, the operator would be required to stop work at various intervals to identify and select the proper height adjustment gauge tool in accordance with the factory setting for a particular engine. Moreover, this selection process could be a choice out of many height gauge tools. Such a selection could significantly slow down the assembly process. Additionally, an operator having to sort/shuffle through various height gauge tools in order to perform all or part of an assembly process, which otherwise requires precision and true detail to work, could be a cumbersome task. Furthermore, there is a potential to lose individual height gauge tools from a complete set, since different tools are required for different engine/fuel injector height adjustment settings.

Accordingly, it is desirable to provide an easy-to-use and simple compact tool capable of readily adjusting the height of a fuel injector in an automotive engine assembly. It is also desirable to provide a single tool which is capable of making a plurality of height adjustments in order to alleviate an extra amount of tools which could be otherwise required to match various height requirements per the fuel injector setting corresponding to different engines. It is also desirable to provide a method of adjusting a fuel injector in an engine assembly.

SUMMARY OF THE INVENTION

The foregoing needs are met, to a great extent, by the present invention, wherein in one aspect an apparatus is provided that in some embodiments includes a gauge body having a top surface, a first opening, and at least one notch located on a periphery of the first opening. A gauge pin may be located in the first opening, and, additionally, a handle may be connected to the gauge pin.

In accordance with another aspect of the present invention, a method is provided to include providing an adjustable height gauge, selecting a height on the gauge, setting the height on the gauge, and adjusting the height of a fuel injector in accordance with the height of the gauge.

In accordance with yet another aspect of the present invention, a system of adjusting the height of a fuel injector is provided including a means for adjusting a height of a gauge, means for selecting the height of the height adjusting means, means for setting the gauge to the selected height, and a means for retaining the gauge at the select height.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
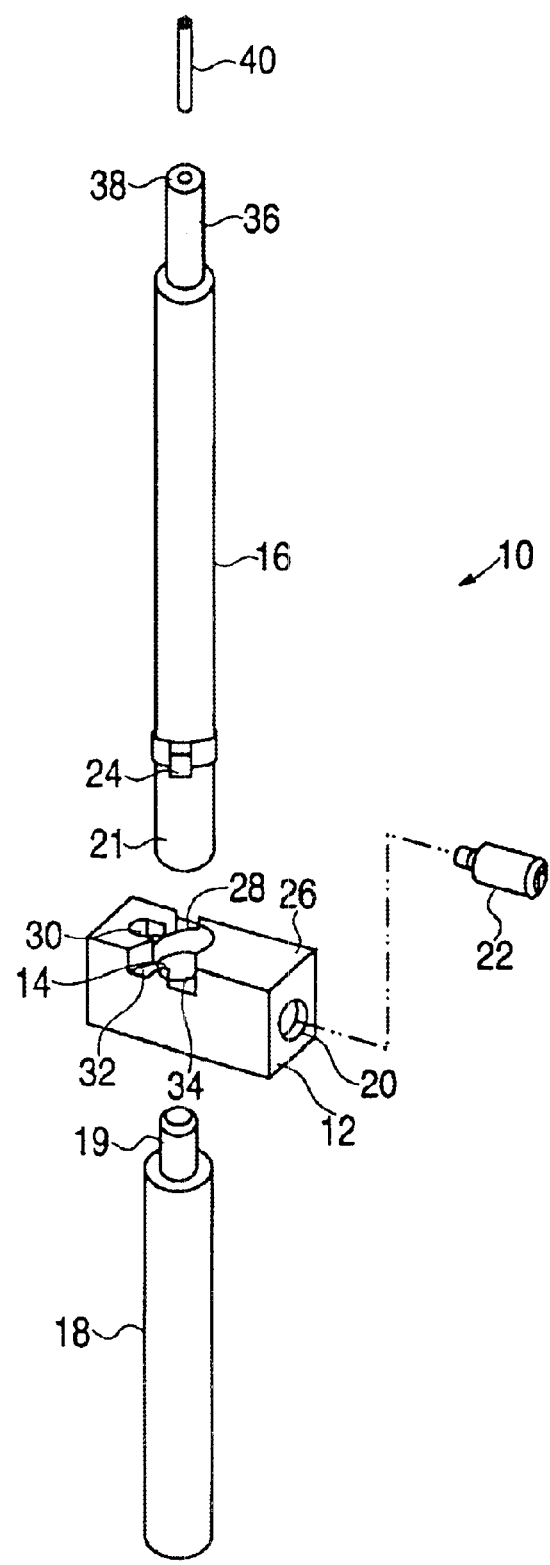
FIG. 1 is a schematic view illustrating a variable fuel injector height gauge according to a preferred embodiment of the invention.

An embodiment in accordance with the present invention provides a single tool that can be adjusted to a plurality of different positions that will duplicate the height gauge dimensions of each of the separately existing tools. An embodiment in accordance with another aspect of the present invention provides a method of adjusting the fuel gauge height by adjusting a single tool to a plurality of different positions that will duplicate the height gauge dimensions of each of the separately existing tools. The invention will now be described with reference to the drawing figures, in which like reference numerals refer to like parts throughout.

An embodiment of the present inventive apparatus is illustrated in FIG. 1, as a variable fuel injector height gauge 10. The variable fuel injector height gauge 10 may be composed of various components including a gauge body 12 having a gauge surface 26 and gauge notches 28, 30, 32, and 34. The gauge body 12 is preferably configured to include a first opening 14 and a second opening 20. The first opening 14 and the second opening 20 may be enabled to accept additional components. For example, the first opening 14 may receive an end of a gauge pin 16. A handle 18 may be designed to retain the gauge pin 16 within the first opening 14. Preferably, the handle 18 is configured with a male threaded end 19 which is preferably received by a female receptacle 21 located at an end of the gauge pin 16. The female receptacle 21 is preferably designed to have mating threads in order to threadably receive the male threads located on the male threaded end 19. While a threaded retention means is the preferred manner in which to retain the gauge pin 16 within the gauge body 12, other means for retaining the gauge pin 16 may be utilized in order to secure the gauge pin 16 to the gauge body 12.

In a preferred embodiment of the invention the gauge pin 16 is further designed with a protruding tang 24 extending from the gauge pin 16. The tang 24 may be used to engauge either the top surface 26 or one of a plurality of recessed notches located in the gauge body. For purpose of example, FIG. 1 illustrates four recessed notches 28, 30, 32, or 34 located on a periphery of the first opening 14 in the gauge body 12, however, additional or less notches may be utilized as deemed necessary. In this example, as the gauge pin 16 is located in the first opening 14, the gauge pin 16 can be rotated and moved axially so that the protruding tang 24 engauges with the top surface 26 or one of four recessed notches 28, 30, 32, or 34 of the gauge body 12. These notches may be considered as a first notch 28, a second notch 30, a third notch 32, and a fourth notch 34. In a preferred embodiment of the invention, the notches are recessed at different height levels on the gauge body 12. In this example, with each location of the tang 24 into a respective notch, a second height setting, a third height setting, a fourth height setting, and a fifth height setting may be achieved respectively. The option of setting the tang at one of five different positions, for example, effectively causes the gauge pin to be set at one of five different height settings. The ability of the gauge pin 16 of the present invention to be set at the various height settings effectively duplicates the gauge dimensions of existing separate tools corresponding to each height setting. Hence, by using the gauge pin 16 of the variable fuel injector height gauge 10, an operater may replace existing separate tools by using only one fuel injection height gauge tool 10 of the present invention.

In accordance with a preferred embodiment of the invention, the second opening 20 of the gauge body 12 is configured to accept a set screw 22. The set screw 22 is inserted into the second opening 20 and can be tightened to lock the gauge pin 16 and the gauge body 12 rigidly together. While many means may be utilized to secure the set screw 22 to the gauge body 12, a male thread on the outer diameter of the set screw 22 is preferably connected to female mating threads located in the second opening 20.

The design of the gauge pin 16 may also contain a spring pin mount 36 having a spring pin mount end 38. The spring pin mount 36 is generally configured to receive a spring pin 40 which is commonly used for alignment purposes. For instance, in order to properly locate the variable fuel injector height gauge 10, an operator may insert the spring pin 40 into a height gauge pilot hole generally provided on a surface of a fuel injector body.

The height gauge pilot hole provides a reference point for which an operator may begin to use a height gauge tool. The height gauge tool is subsequently utilized by the operator to make adjustments to the height of a fuel injector in an engine assembly as deemed necessary. Once the spring pin 40 is located into the height gauge pilot hole, the operator may make a proper adjustment to the fuel injector based on the height of the gauge tool being utilized. The variable fuel injector height tool of the present invention provides variable height settings for which an operator may utilize in order to set fuel injectors in an engine assembly.

Figure 2:
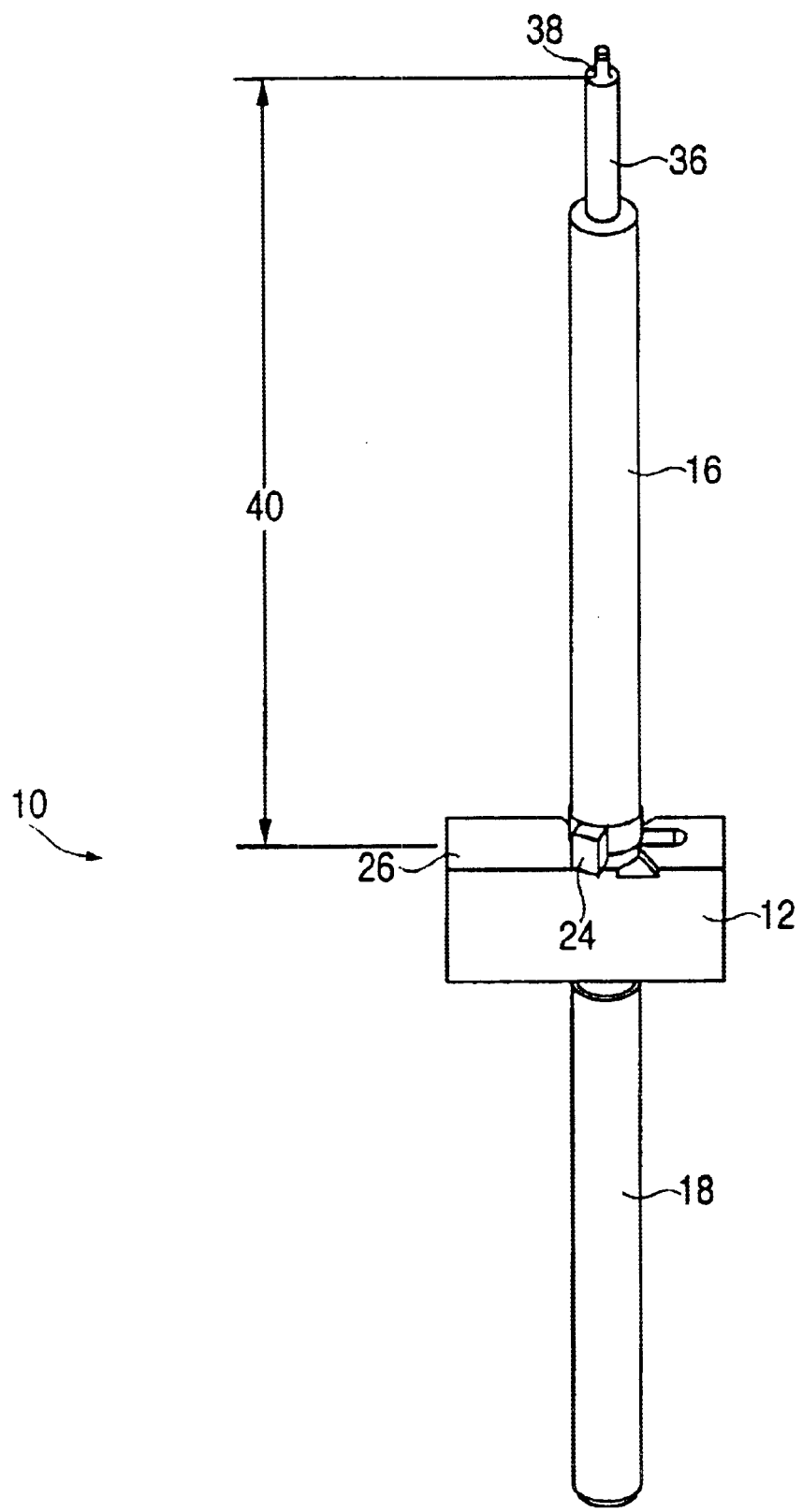
FIG. 2 is a perspective view of a variable fuel injector height gauge illustrating a first height setting.

For instance, FIG. 2 illustrates a first height setting, referred to as a first gauge dimension 40, of the variable fuel injector gauge 10. The position of the tang 24 rests upon the top surface 26 of the gauge body 12, thus, achieving the first height setting. This height setting of the first gauge dimension 40 may be utilized to set a fuel injector height in an engine assembly. However, if desired, another height selection of the variable fuel injector height gauge 10 may be set. For instance, by rotating the gauge pin 16 slightly, the tang 24 can be adjusted to drop into the first notch 28.

Figure 3:
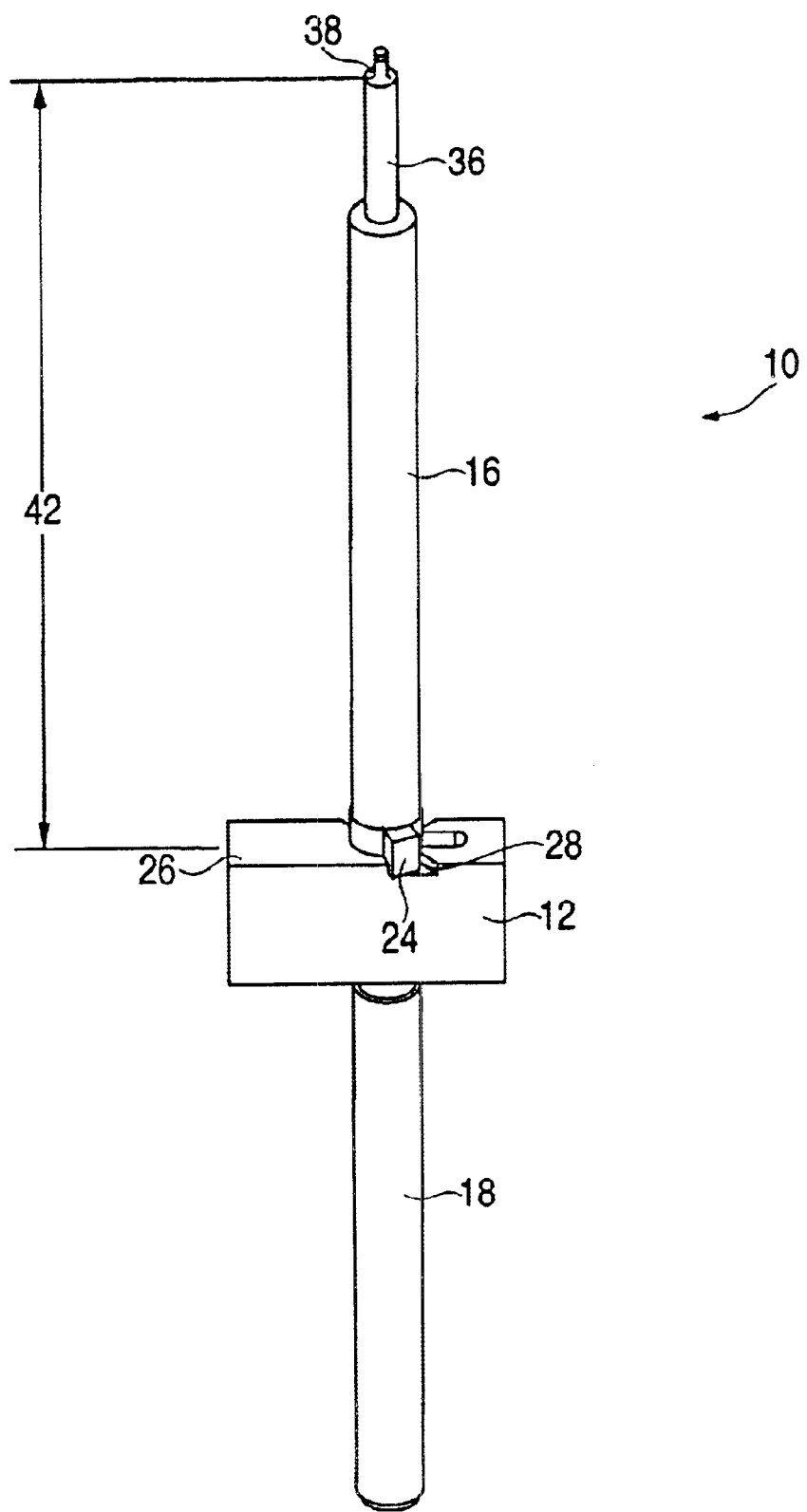
FIG. 3 is a perspective view of a variable fuel injector height gauge illustrating a second height setting.

FIG. 3 illustrates a second height setting, referred to as a second gauge dimension 42, of the variable fuel injector gauge 10. The position of the tang 24 rests within the first notch 28, thus, achieving the second height setting. However, if desired, another height selection of the variable fuel injector height gauge 10 may be set. For instance, by rotating the gauge pin 16 slightly, the tang 24 can be adjusted to drop into the second notch 30.

Figure 4:
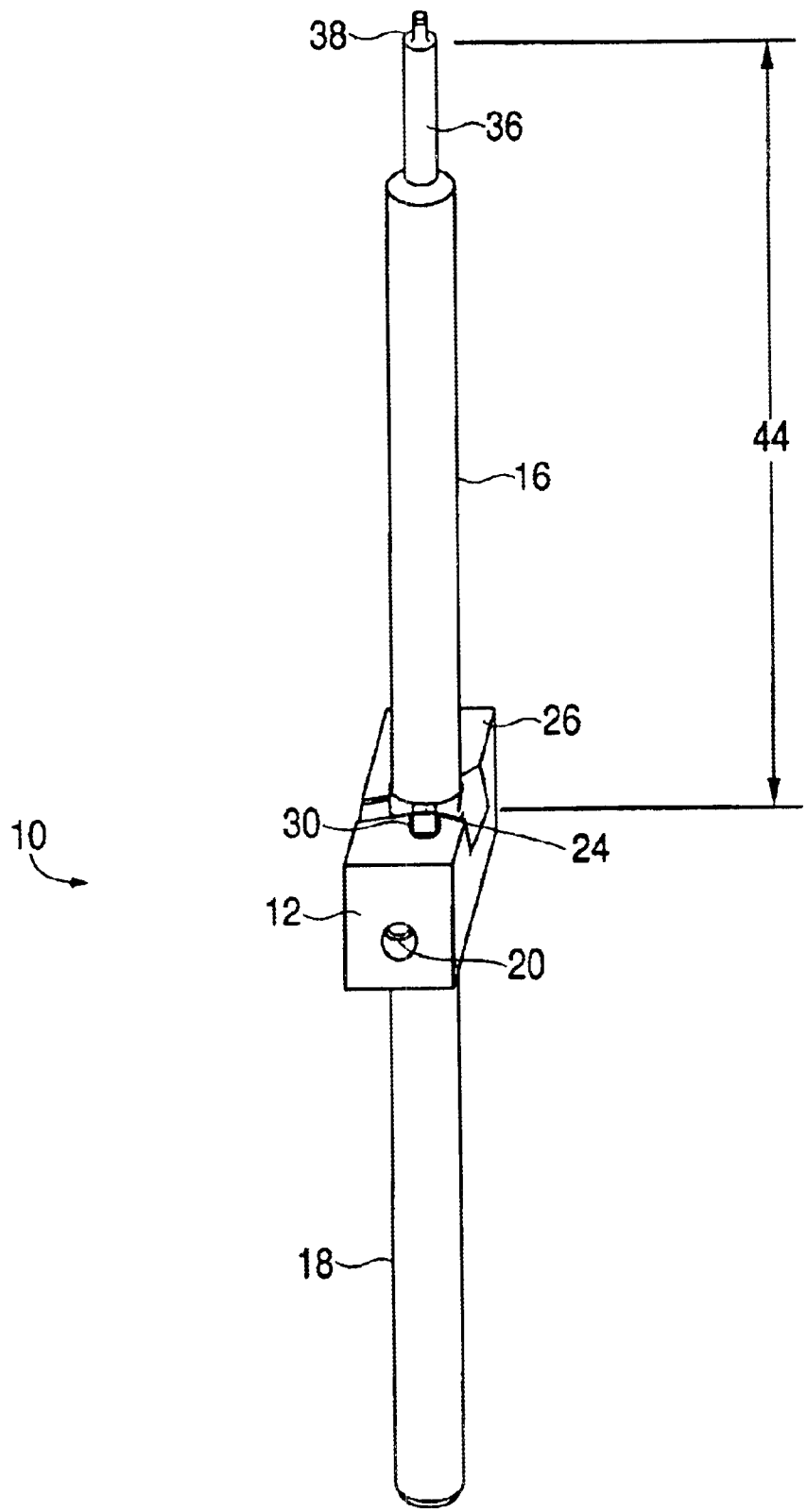
FIG. 4 is a perspective view of a variable fuel injector height gauge illustrating a third height setting.

FIG. 4 illustrates a third height setting, referred to as a third gauge dimension 44, of the variable fuel injector gauge 10. The position of the tang 24 rests within the second notch 30, thus, achieving the third height setting. However, if desired, another height selection of the variable fuel injector height gauge 10 may be set. For instance, by rotating the gauge pin 16 slightly, the tang 24 can be adjusted to drop into the third notch 32.

Figure 5:
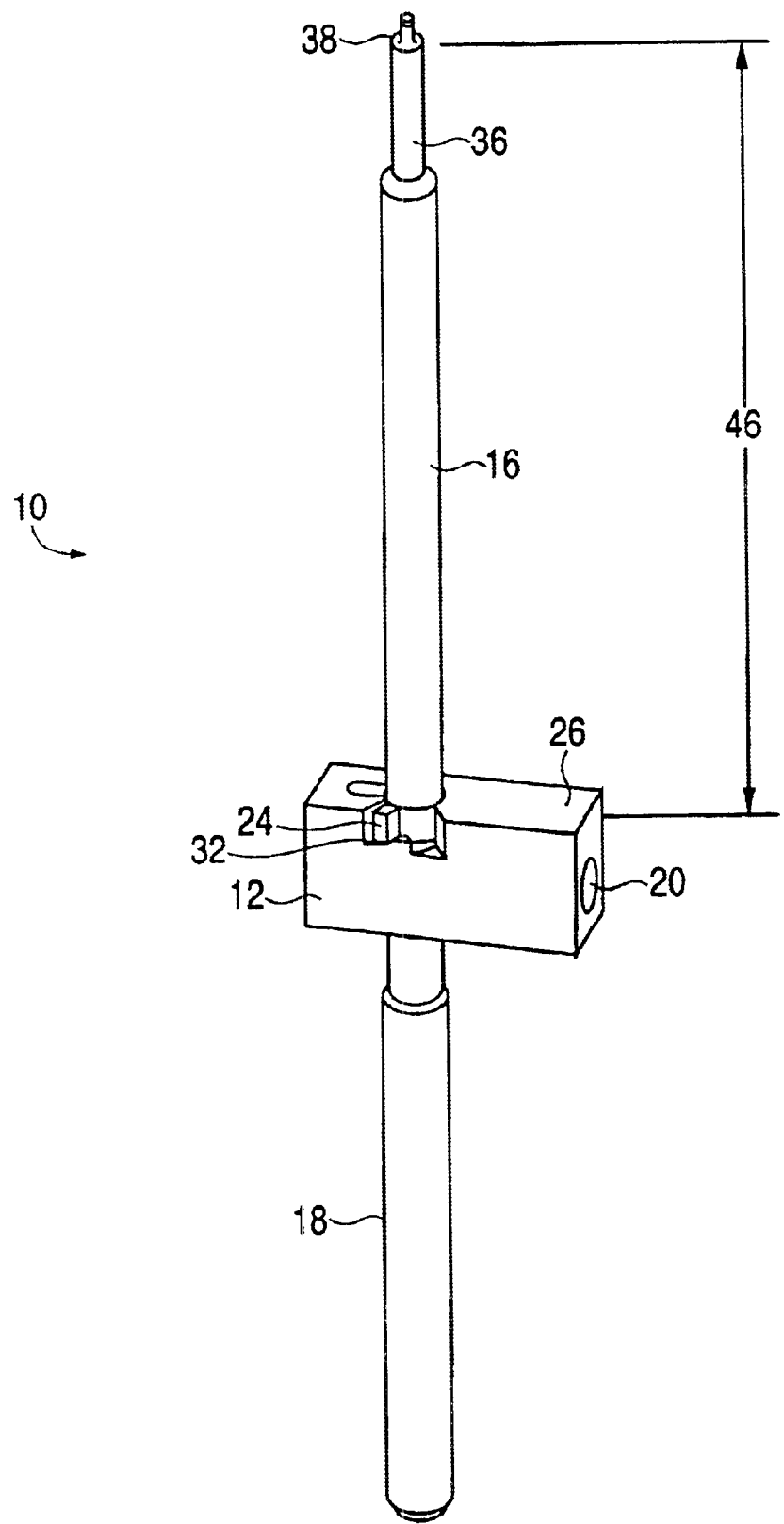
FIG. 5 is a perspective view of a variable fuel injector height gauge illustrating a fourth height setting.

FIG. 5 illustrates a fourth height setting, referred to as a fourth gauge dimension 46, of the variable fuel injector gauge 10. The position of the tang 24 rests within the third notch 32, thus, achieving the fourth height setting. However, if desired, another height selection of the variable fuel injector height gauge 10 may be set. For instance, by rotating the gauge pin 16 slightly, the tang 24 can be adjusted to drop into the fourth notch 34.

Figure 6:
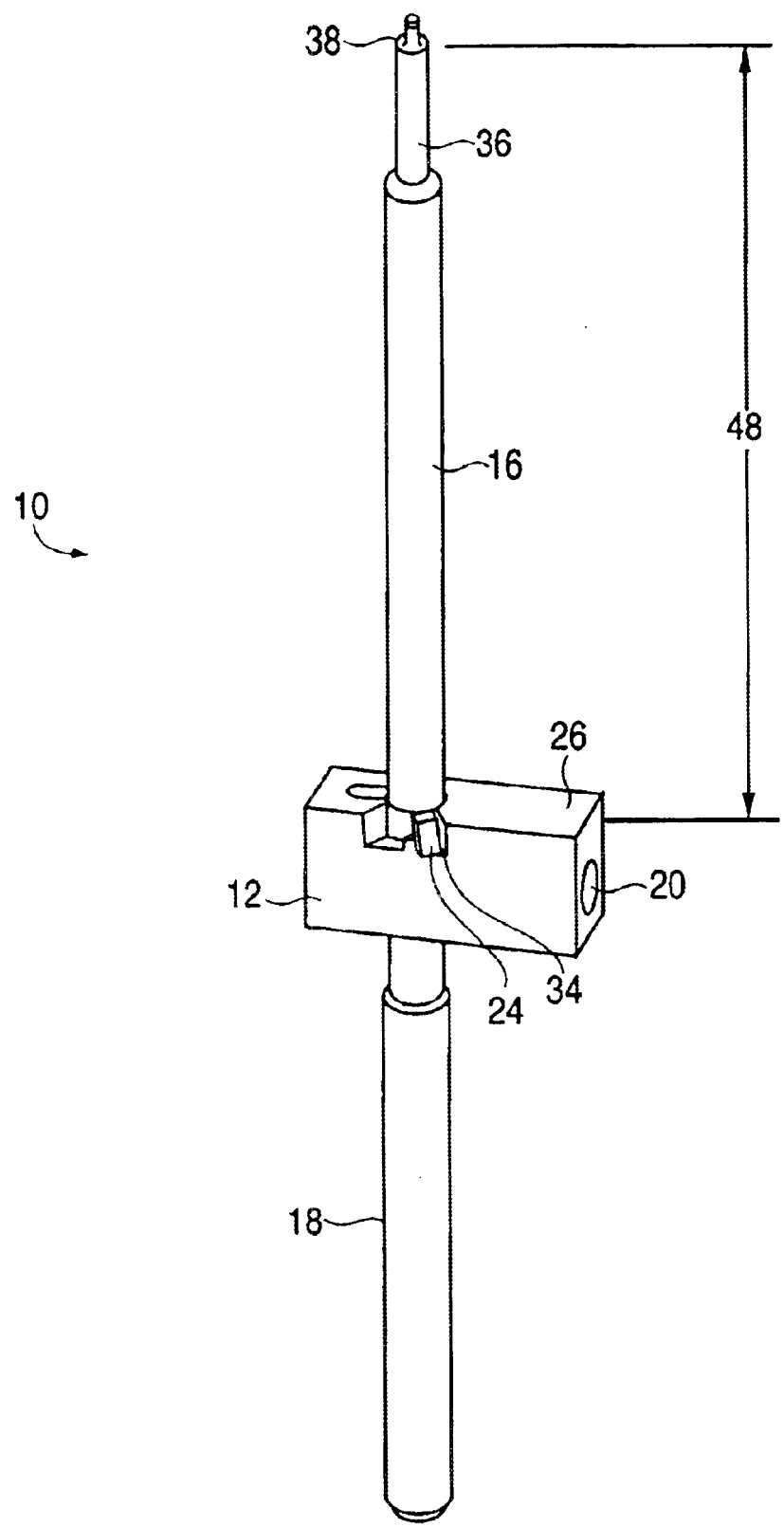
FIG. 6 is a perspective view of a variable fuel injector height gauge illustrating a fifth height setting.

FIG. 6 illustrates a fifth height setting, referred to as a fifth gauge dimension 48, of the variable fuel injector gauge 10. The position of the tang 24 rests within the fourth notch 34, thus, achieving the fifth height setting. Although five height settings have been described in the illustration of different height adjustments of the variable fuel injector height gauge 10, it is appreciated that additional or less heights may be configured on the gauge body 12 to achieve a desired height.

Figure 7:
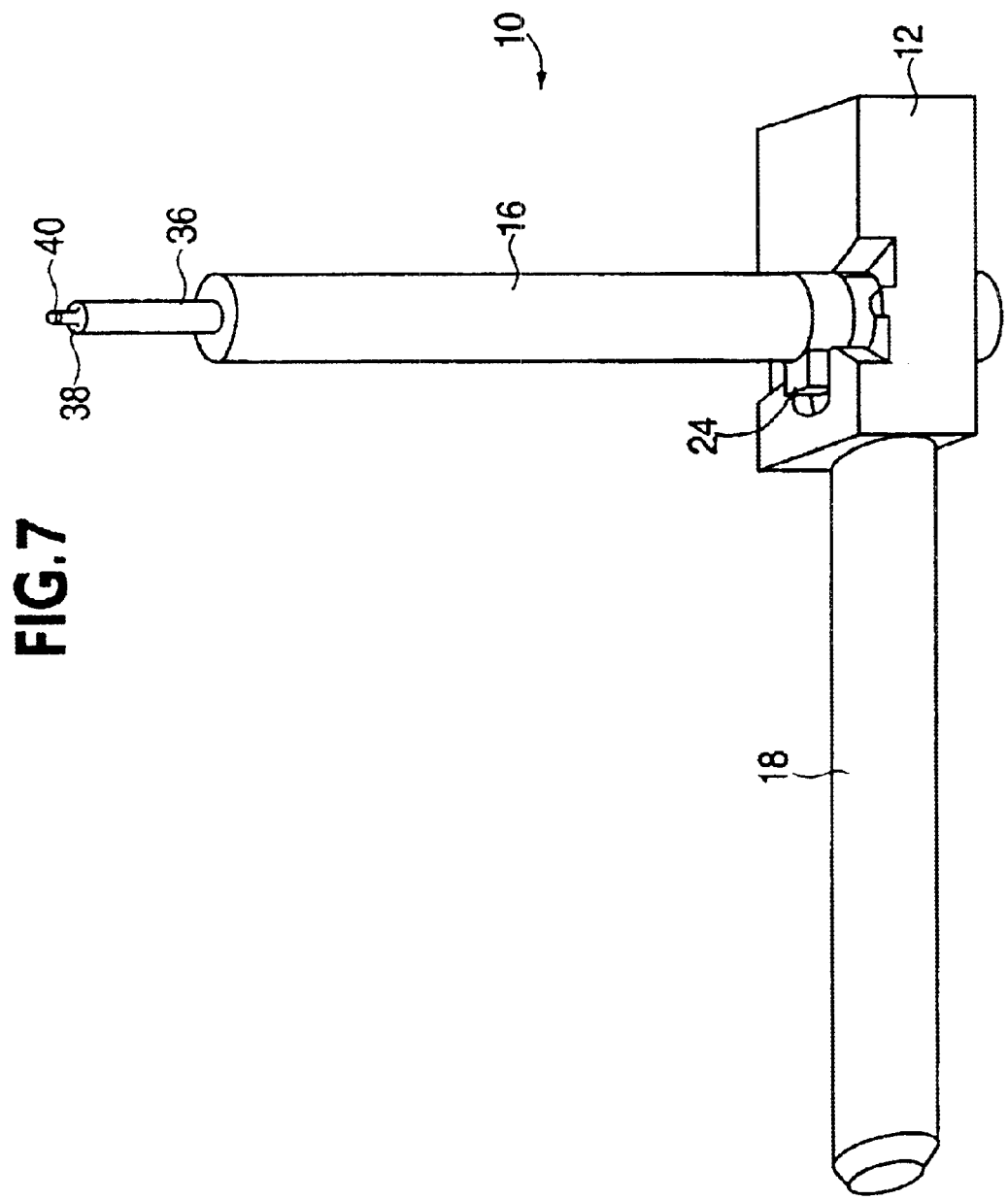
FIG. 7 is a perspective view of a variable fuel injector height gauge according to an alternative embodiment of the invention.

In an alternative embodiment of the invention, the handle 18 may be installed directly into the gauge body 12 as shown in FIG. 7. FIG. 7 illustrates the male threaded end 19 of the handle 18 installed through the second opening 20 of the gauge body 12 in a 90° orientation to the gauge pin 16. The 90° orientation allows additional flexibility for an operator to utilize the variable fuel injector height gauge 10 in additional operating positions. While FIG. 7 illustrates the handle 18 at a 90° orientation to the gauge pin 16, it will be appreciated that the gauge 12 may also be configured to include additional or alternate openings for the handle 18 to allow for additional operating angles. Although an example of the fuel injector height gauge 10 is shown using threaded connections, it will be appreciated that other connections can be used. Also, although the fuel injector height gauge 10 is useful to adjust and position fuel injectors within engine assemblies it can also be used to position additional components requiring height adjustments and/or alignment.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A variable apparatus for adjusting the height of a fuel injector comprising:
   a gauge body having a top surface, a first opening, and at least one notch located on a periphery of the first opening;
   a gauge pin located in the first opening; and
   a handle connected to the gauge pin.

2. The apparatus of claim 1, wherein the adjustable gauge body further comprises:
   a plurality of notches located on the periphery of the first opening, the plurality of notches located at different height settings along the periphery of the first opening.

3. The apparatus of claim 2, wherein the gauge pin further comprises:
   a tang protruding from a location on the gauge pin.

4. The apparatus of claim 3, wherein the tang is located in one of the plurality of notches.

5. The apparatus of claim 1, further comprising:
   a second opening located on the gauge body.

6. The apparatus of claim 5, further comprising:
   a set screw located in the second opening for rigidly retaining the gauge pin to the gauge body.

7. The apparatus of claim 5, wherein the handle is connected to the gauge body generally at a 90 degree orientation to the gauge pin.

8. The apparatus of claim 1, wherein the gauge pin further comprises:
   a tang protruding from a location on the gauge pin.

9. The apparatus of claim 8, wherein the tang is located on the top surface.

10. The apparatus of claim 9, wherein the tang is located in the at least one notch.

11. A method of adjusting the height of a fuel injector comprising:
   providing a gauge having a gauge body, wherein the gauge body has a top surface, a first opening, and at least one notch located on a periphery of the first opening;
   locating a gauge pin in the first opening;
   connecting a handle to the gauge pin; and
   adjusting the height of the fuel injector in accordance with the gauge.

12. The method of claim 11, further comprising
   providing a gauge having an adjustable height;
   selecting a height on the gauge;
   setting the height on the gauge; and
   adjusting the height of the fuel injector in accordance with the height of the gauge.

13. The method of claim 11, further comprising:
   providing a plurality of notches at different height settings on the periphery of the first opening.

14. The method of claim 11, further comprising:
   providing a tang protruding from a location on the gauge pin.

15. The method of claim 14, wherein the setting step comprises:
   locating the tang on the top surface of the gauge body.

16. The method of claim 14, wherein the setting step comprises:
   providing a plurality of notches at different height settings on the periphery of the first opening; and
   locating the tang on one of the at least one notch or in one of the plurality of notches located on the periphery of the first opening.

17. The method of claim 11, further comprising:
   providing a second opening located on the gauge body.

18. The method of claim 17, further comprising:
   locating a set screw in the second opening for rigidly retaining the gauge pin to the gauge body.

19. A system for adjusting the height of a fuel injector comprising:
   means for adjusting a height of a gauge, said adjusting means having a gauge body, wherein the gauge body has a top surface, a first opening, and a means for selecting a height of the adjusting means located on a periphery of the first opening;
   means for setting a height located in the first opening; and
   means for extending connected to the setting means.

20. The system of claim 19 wherein the height selecting means comprises:
   and at least one notch located on a periphery of the first opening.

21. The system of claim 20, wherein the height selecting means further comprises:
   a plurality of notches located on the periphery of the first opening, the plurality of notches located at different height settings along the periphery of the first opening.

22. The system of claim 19, wherein the height setting means comprises:
   a gauge pin.

23. The system of claim 22, further comprising:
   a tang protruding from a location on the gauge pin.

24. The system of claim 22, wherein the extending means comprises a handle connected to the gauge pin.

25. The system of clam 22, further comprising a means for retaining the adjusting means at a selected height.

26. The system of claim 25, wherein the means for retaining the adjusting means at a selected height comprises:
   a set screw connected to the gauge body for rigidly retaining the gauge pin to the gauge body.

* * * * *